Oct. 30, 1956   H. J. McDONALD ET AL   2,768,948
METHOD AND APPARATUS FOR IONOGRAPHY
Filed May 19, 1952   3 Sheets-Sheet 1
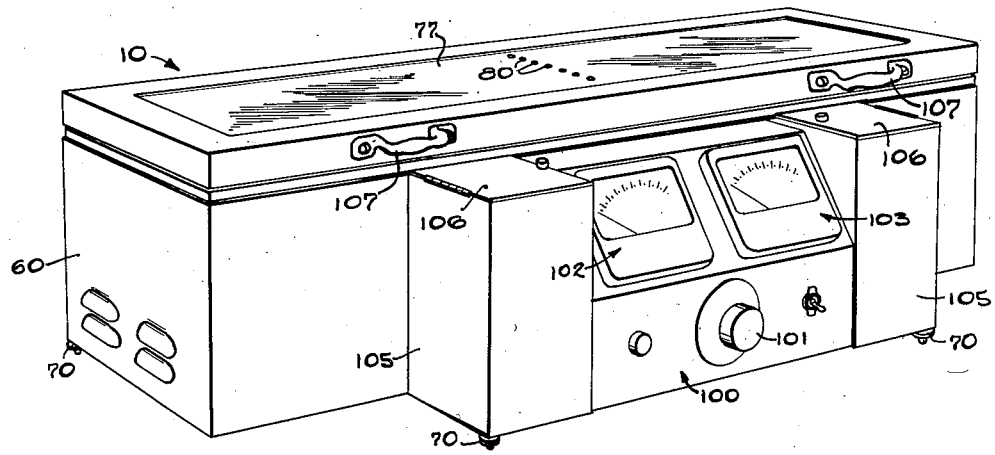
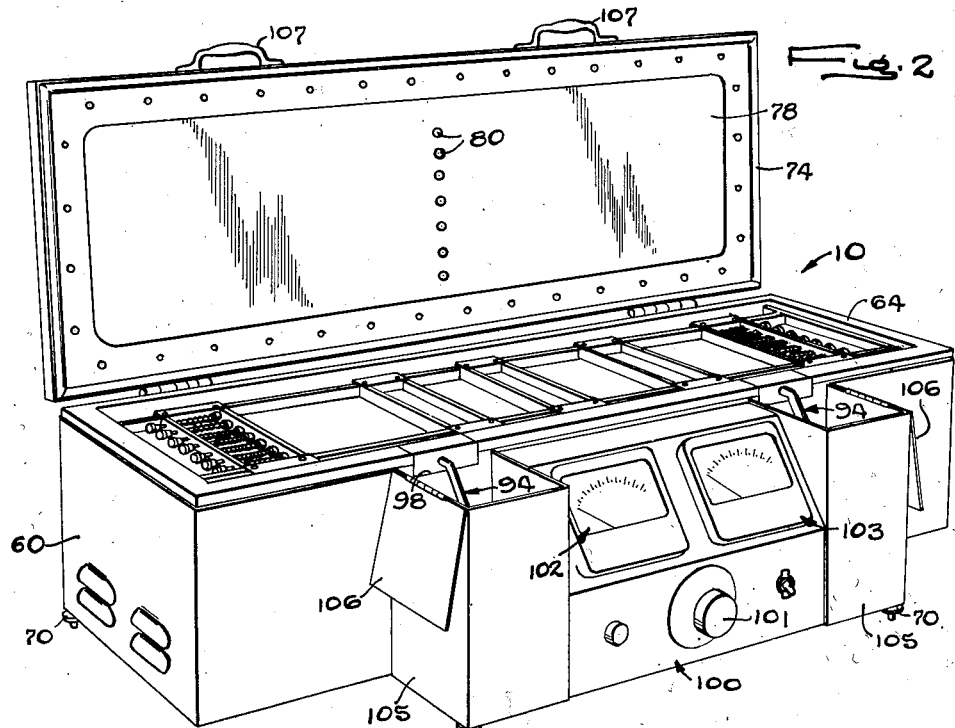
INVENTORS
Hugh J. McDonald
Martin B. Williamson
By Carlson, Pitzner, Hubbard & Wolfe
ATTORNEYS

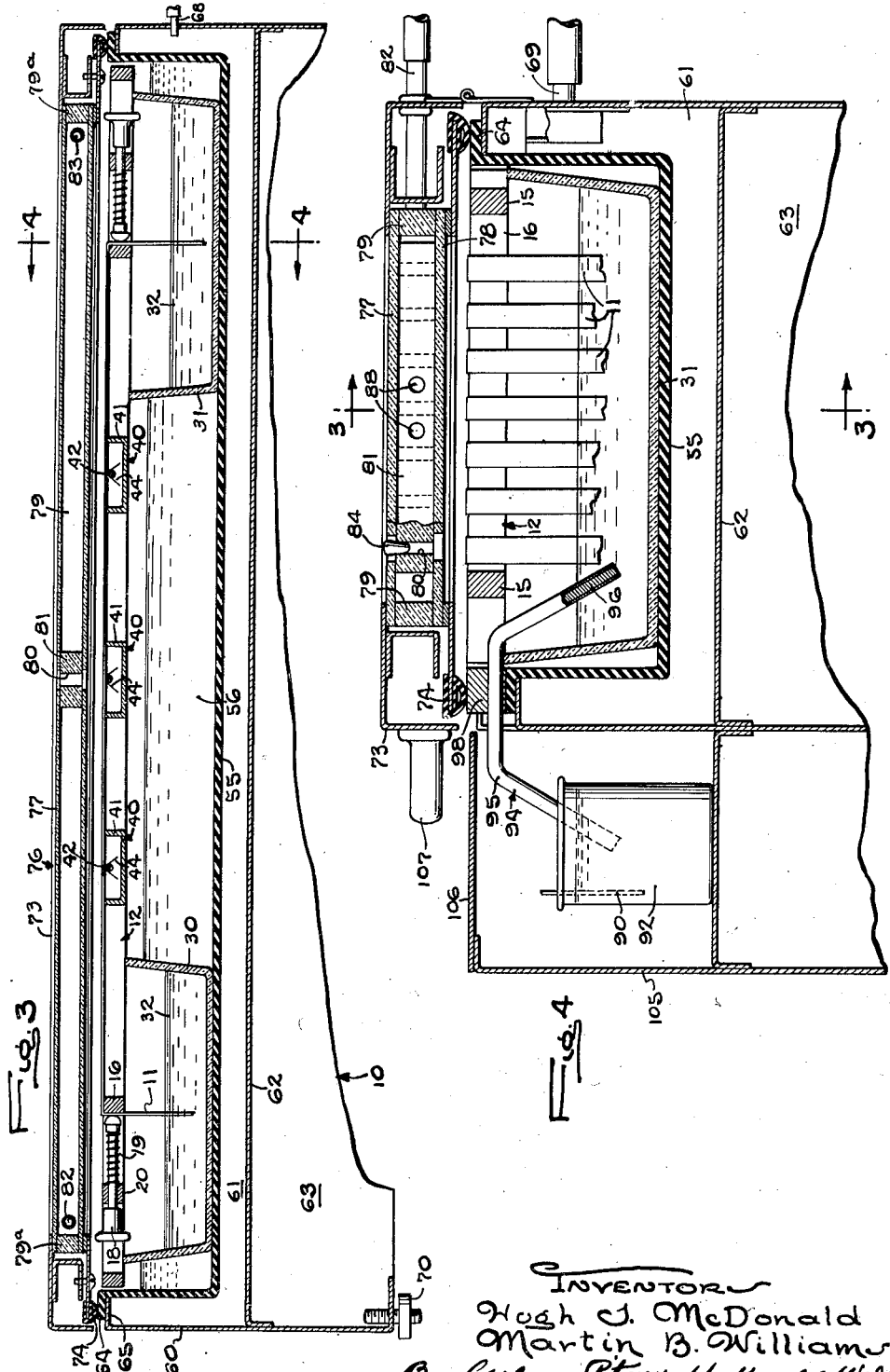

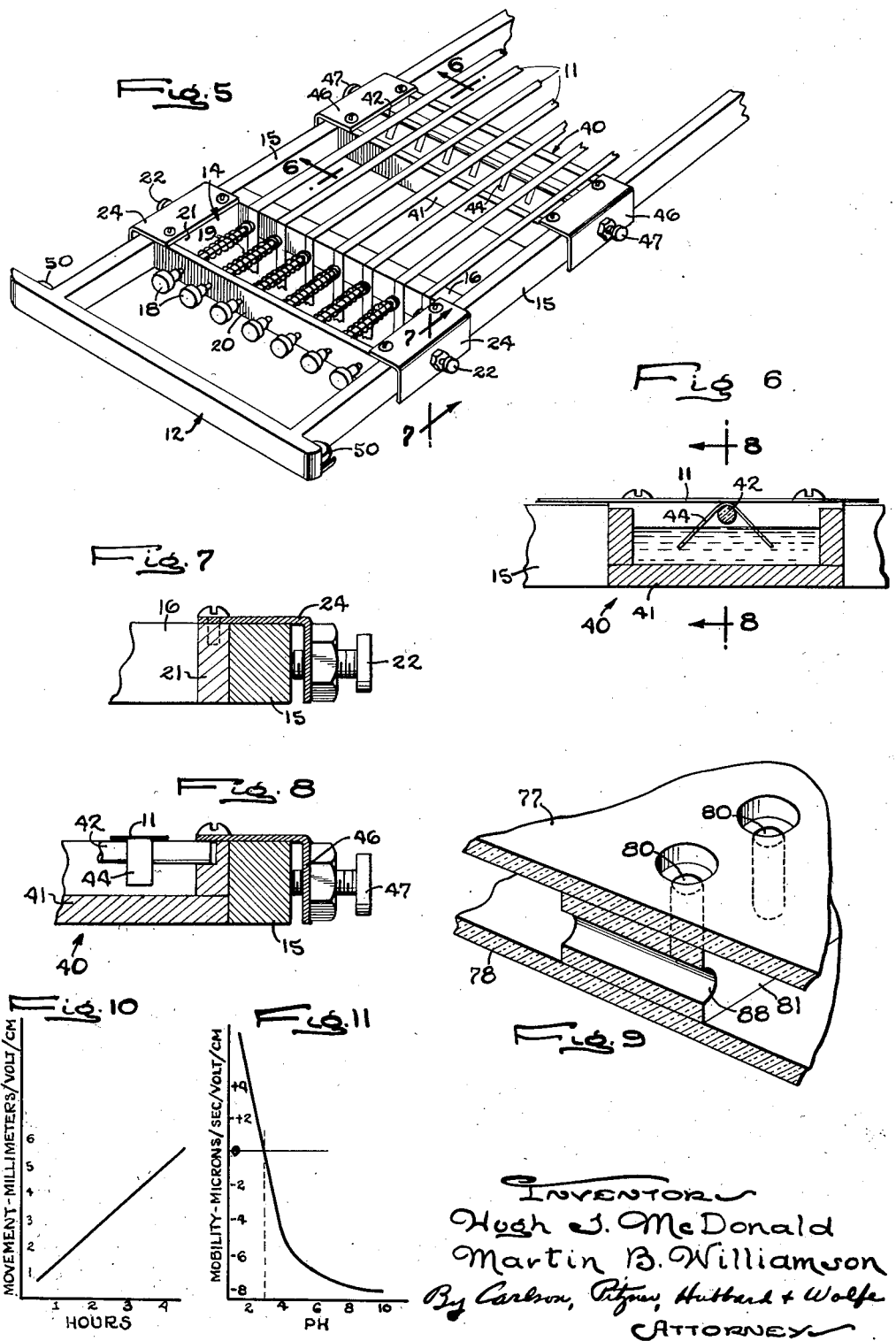

United States Patent Office 2,768,948
Patented Oct. 30, 1956

2,768,948

METHOD AND APPARATUS FOR IONOGRAPHY

Hugh J. McDonald, Cook County, and Martin B. Williamson, Du Page County, Ill., assignors to Precision Scientific Co., Chicago, Ill., a corporation of Illinois Application May 19, 1952, Serial No. 288,716

4 Claims. (Cl. 204—180)

This invention relates to ionography, which is a method based on the phenomena known in physical chemistry as ionophoresis and electrophoresis, involving electrically induced migration of ions or other charged particles in a conductive liquid. In ionography, the conductive liquid is held by a physical structure such as a strip of filter paper or the like. Many substances are caused to move along the strip when deposited locally thereon and subjected to an externally produced voltage gradient. For example ionographic migration is experienced by a variety of organic materials such as proteins, amino acids, and the constituents of biological substances such as blood serum, as well as the ions of inorganic electrolytes such as copper sulfate and nickel sulfate. In the case of inorganic electrolytes, the positively and negatively charged ions migrate in opposite directions.

Ionographic migration may be observed visually in the case of distinctly colored migrants. For colorless migrants, the migration may be detected during a run by testing the moistened paper strip for light absorption, voltage gradient, electrical resistance or dielectric constant. After a run, such colorless migrants may be rendered visible by suitable chemical developers, or by heat. Radioactive migrants may be traced photographically or by other known techniques.

One of the principal objects of this invention is to provide an improved method and apparatus for ionography, whereby accurate and reproducible quantitative measurements may be made of such factors as the mobilities of ions and other charged particles, the transference numbers of ions, and the isoelectric points of ampholytes.

A further object of the invention is to provide a method and apparatus for carrying on ionography with a minimum of interference from such extraneous factors as evaporation of the conductive liquid from the paper strip, heating of the paper strip by the electrical current therein, gravitational flow of the conductive liquid on the strip, temperature variations, and chromatographic adsorption.

It is another object to provide an improved ionographic method and apparatus whereby the velocity of the migrating substance is substantially constant over an extended period of time. In this way the ionophoretic or electrophoretic translation of the migrant substance is a linear function of the time during which the electric current is flowing in the paper strip.

A further object is to provide an improved ionograph including means for holding a plurality of paper strips in flat, horizontal positions by tension applied near the ends of the strips.

Another object is to provide an ionograph having means for continuously moistening the paper strip at one or more points intermediate its ends, as well as at the ends of the strip.

Another object is to provide an improved ionograph having means for controlling the temperature of the paper strip and its environment.

A further object is to provide an ionograph having a housing with a double-walled lid made of transparent material, so that the lid serves as a temperature controlling water jacket as well as an inspection panel.

A general object is to provide an ionographic apparatus which is inexpensive, and which requires very little care and skill in its operation.

Further objects and advantages of the invention will be apparent from the following illustrative description.

The method of this invention utilizes elongated strips made of a suitable absorbent material such as chemically pure filter paper. As an initial step, a strip is moistened with a suitable conductive liquid in such a manner as to produce uniform wetting thereof, preferably by immersing the strip in a quantity of the liquid and allowing the excess to run off, or by feeding a small quantity of the liquid thereto with a pipette. In order to stabilize the hydrogen-ion concentration (pH) of the conductive liquid, the latter is preferably a buffer solution. Various buffer solutions may be employed, depending upon the desired pH and the nature of the migrant. For example, a buffer solution of acetic acid in water may be employed with leucine (an amino acid) as the migrant at a pH value of 2.8. For a pH range of 7.8 to 10, a buffer solution of potassium chloride and sodium hydroxide in water may be employed with histidine as the migrant.

After being moistened, the paper strip is supported in as nearly a flat and horizontal position as possible, preferably by applying tension to the strip near its ends. It is important to maintain the paper strip strictly flat, horizontal and taut in order to avoid undue interference from diffusion, gravitational flow, and chromatographic effects, and in order to maintain uniform wetness along the strip.

The ends of the strip are immersed in separate vessels filled with the conductive liquid to the same level in order to prevent capillary syphoning of the solution along the paper strip. Large quantities of the liquid are used in order to stabilize the pH thereof. In order to dissipate heat generated in the strip due to the electric current therein, the air atmosphere around the strip and the vessels is preferably replaced with an atmosphere of a highly heat conductive gas, such as hydrogen or helium. It is highly desirable to saturate the gas with vapor of the conductive liquid so as to minimize evaporation of the liquid from the strip.

After these preparations, a test sample is deposited on the paper strip at a previously marked point, usually at the center of the strip. The sample may be composed of materials selected from a large class of inorganic and organic compounds, and may be deposited on the strip in the solid, dissolved, or colloidally dispersed state.

A potential gradient is set up along the strip by applying a voltage between the immersed ends thereof, preferably by means of a pair of electrodes immersed in separate electrode vessels connected to the main vessels by tubular salt bridges filled with a gel of agar in a buffer solution of potassium chloride, the level of the solution being the same in all the vessels. This arrangement minimizes diffusion of electrolysis products into the main vessels, and thereby stabilizes the pH of the conductive liquid therein.

While the voltage is being applied to the strip, the immersing vessels and the atmosphere surrounding the strip are maintained at a constant temperature. One effect of this step is to minimize evaporation of the liquid from the paper strip. The heat generated by the electrical current in the strip is rapidly dissipated by the highly conductive atmosphere of helium or hydrogen. Maintaining a constant temperature effects a great improvement in the accuracy and reproducibility of the results obtained by ionography.

It is highly desirable to supply the conductive liquid continuously to the strip at one or more points between the immersed ends of the strip. In this way the wetness of the strip is maintained substantially constant and uniform. The liquid may be supplied to the strip by means of paper wicks dipping into separate vessels of the liquid, preferably maintained at the same level as in the main vessels.

Ordinarily, the entire body of the test sample or its ionic components experience a migration in one direction or the other under the influence of the potential gradient along the strip. Amino acids may be rendered visible in their final positions by drying the strip and then spraying it with a solution of 0.1% ninhydrin in a 5% solution of butanol in water. This process stains the amino acids so that they appear as differently colored bands spaced along the strip. Proteins may be stained blue by immersing the paper in a 1% solution of bromophenol blue in alcohol saturated with mercuric chloride, and then washing the paper thoroughly. More vivid and definite stained zones may be produced in the case of proteins by the following process. The paper is dried and then immersed in a 2% solution of lead acetate containing 1% acetic acid. Repeated immersions in 1% acetic acid then serve to wash out the excess lead acetate. After a second drying, the strip is treated with a 1% solution of bromophenol blue in alcohol and washed thoroughly.

The method of this invention may advantageously be practiced by means of an apparatus constructed in accordance therewith. An illustrative embodiment of such an apparatus is disclosed in the following description and the accompanying drawings, in which:

Figure 1 is a perspective view showing the external appearance of ionographic apparatus constructed in accordance with the invention.

Fig. 2 is a perspective view showing the apparatus with the main cover and the electrode housing covers in open positions.

Fig. 3 is a central longitudinal sectional view of the apparatus taken as indicated by the line 3—3 in Fig. 4.

Fig. 4 is a transverse sectional view taken along the line 4—4 in Fig. 3.

Fig. 5 is a fragmentary perspective view showing certain details of a paper holding and moistening arrangement.

Fig. 6 is a fragmentary sectional view taken along the line 6—6 in Fig. 5 and showing a strip moistening arrangement.

Fig. 7 is a fragmentary sectional view taken along the line 7—7 in Fig. 5.

Fig. 8 is a fragmenatry sectional view taken along the line 8—8 in Fig. 6.

Fig. 9 is a fragmentary perspective view of the main cover for the ionographic apparatus showing a section taken along the line 9—9 in Fig. 4.

Figs. 10 and 11 are graphs illustrating exemplary data obtained with the method and apparatus of this invention.

While the invention is susceptible of various modifications and alternative constructions, there is shown in the drawings and will herein be described in detail the preferred embodiment, but it is to be understood that it is not thereby intended to limit the invention to the form disclosed, but it is intended to cover all modifications, equivalents and alternative constructions falling within the spirit and scope of the invention as expressed in the appended claims.

The drawings illustrate ionographic apparatus 10 for producing electromigration along a plurality of paper strips 11, seven of the strips being illustrated. A support or rack 12 is provided for holding the strips in flat, horizontal side-by-side positions, preferably by means of tension applied to the strips near their ends. In this instance, the paper rack 12 includes a pair of paper clamps 14, adjustably mounted on longitudinal side rails 15. Each of the paper clamps 14 includes a paper clamping anvil taking the form of a crossbar 16 preferably made of an electrically nonconductive chemically inert material such as a synthetic plastic. The paper strips are clamped against the anvil 16 by means of individual movable members preferably comprising draw bolts 18, pressed into engagement with the anvil by compression springs 19, and guided in a crossbar 20 secured to the anvil 16 by a pair of spacers 21. Suitable screws or bolts (not shown) may be passed through the crossbars 16 and 20 into opposite ends of the spacers 21 to form a rectangular unit. To provide for adjustment of the spacing of the paper clamps 14, they are secured to the rails 15 by means of clamping screws 22 threaded in angle brackets 24 which hook over the upper edges of the rails.

Vessels are provided in the form of relatively large glass trays 30 and 31, adapted to contain quantities of a suitable conductive liquid 32 such as a 0.1 normal buffer solution of potassium chloride for example, the ends of the paper strips 11 being immersed in the vessels. The liquid level is the same in the two containers 30 and 31 so as to minimize capillary syphoning of the solution along the paper strip. In this instance the opposite ends of the paper rack 12 are supported on the upper edges of the trays 30 and 31.

In order to maintain uniform wetness along the paper strips 11, the ionographic apparatus 10 is preferably provided with one or more moistening devices 40, three of which are illustrated, for supplying liquid to the strips at one or more points intermediate the ends thereof. In this instance, the moistening devices 40 comprise respective shallow troughs 41 which preferably are supported for adjustment along the rails 15 of the paper rack 12. Individual electrically insulating, chemically inert rods 42 span the troughs 41 from end to end and extend transversely of the paper strips 11. The tops of the rods 42 are substantially at the same level as the top of the paper clamping anvils 16. Individual wicks in the form of U-shaped paper strips or bridges 44 are draped over the rods 42 under the paper strips for conveying buffer solution from the troughs 41 to the respective strips 11, the ends of the U-shaped wicks being immersed in small quantities of the conductive liquid contained in the troughs 41. The moistening devices 40 are supported on the rails 15 by means of angle brackets 46 hooked over the top edges of the rails and clamped thereto by means of clamping screws 47.

One or more level bubbles 50 (Fig. 5) are preferably mounted on the paper rack 12 to facilitate accurate leveling of the paper strips. In the illustrated embodiment, the trays 30 and 31 are supported in a large shallow tray or tank 55 adapted to hold a quantity of a liquid 56 which serves as a heat conducting medium to maintain the containers 30 and 31 at the same temperature. The liquid 56 preferably consists of the solvent utilized in the buffer solution. In this way, the liquid 56 provides vapor tending to prevent evaporation of the buffer solution from the paper strips 11. The tank 55 may be made of an electrically insulating material such as hard rubber.

Means is provided for controlling the temperature of the strips 11, the trays 30 and 31, and the surrounding environment. In furtherance of this purpose, the tank 55 is mounted in an outer casing or housing 60 having upper and lower compartments 61 and 63 defined by a horizontal partition 62. In the illustrated embodiment, the tank 55 has an outwardly directed marginal flange 64 at its upper edge adapted to rest upon an inwardly directed marginal flange 65 on the upper edge of the housing 60. A temperature controlling fluid such as water may be circulated through the upper compartment 61 by means of a pair of hose connections 68 and 69. A plurality of leveling screws 70 are provided to support the housing 60 so that the paper strips 11 may be leveled accurately.

The housing 60 is preferably provided with a lid or cover 73 which in this instance is hinged to the rear wall thereof. In the illustrated embodiment, a vapor-tight sealing gasket 74 is mounted along the marginal edge of the lid for engagement with the flange 64 on the tank 55. To provide additional temperature control, a transparent water jacket and inspection panel 76 is mounted in the lid 73. The panel 76 is illustrated as including upper and lower walls 77 and 78, made of a transparent material such as Lucite, separated at their edges by longitudinal spacing strips 79 and transverse spacing strips 79a. The walls and the strips thus form a jacket through which a temperature controlling fluid may be circulated by means of hose connections 82 and 83 extending through the rear edge of the lid 73.

Provision is made for the depositing of test samples upon the paper strips 11 without lifting the lid 73. In the illustrated embodiment, the lid 73 has a plurality of apertures 80 spaced from front to rear, one of the apertures 80 being provided for each of the strips. The apertures extend through the upper and lower transparent walls 77 and 78 and also through a spacing bar 81 interposed between the walls at this point to prevent leakage of the temperature controlling fluid through the apertures 80. Suitable stoppers 84 may be utilized to close the apertures 80. As shown in Fig. 4, the spacing bar 81 has one or more horizontal perforations 88 to facilitate passage of the cooling fluid from end to end in the interior of the jacketing inspection panel 76.

A pair of electrodes 90 are provided for applying voltage to the ends of the paper strips 11. The electrodes 90 may take the form of platinum wires, preferably immersed in a pair of separate electrode beakers 92 containing the conductive liquid at the same level as in the immersing containers 30 and 31. In this instance the electrode beakers are connected to the trays 30 and 31 by means of a pair of salt bridges 94, preferably comprising glass tubes 95 containing an electrically conductive gel 96. The gel may be formed, for example, from agar and a solution of potassium chloride. One effect of the salt bridges 94 is to stabilize the pH in the vessels 30 and 31 by minimizing diffusion of electrolysis products from the electrode beakers 92 into the vessels 30 and 31. The salt bridges pass through notches 98 in the upper edge of the tank 55.

A unidirectional voltage is applied between the electrodes 90 by means which preferably includes a regulated electronic power supply 100 (Fig. 2) of conventional construction. The voltage source 100 preferably includes a control knob 101 for varying the voltage applied to the electrodes, as well as a voltmeter 102 for measuring the voltage and a milliammeter 103 for measuring the current through the paper strips 11. Some of the components of the electrical power supply 100 may be enclosed in the lower compartment 63 of the housing 60.

In the illustrated embodiment, the electrode beakers 90 are enclosed in housings 105 protruding forwardly of the main housing 60. The housings 105 are provided with hinged covers 106 positioned to be held shut by handles 107 on the main cover. This arrangement provides protection for the operator against accidental contact with the high voltage electrodes in the housings 105.

As an initial step in preparing the ionographic apparatus 10 for use, the filter paper strips 11 are mounted on the paper supporting rack 12. This is done by withdrawing the draw bolts 18 manually from the anvil bars 16 and inserting the strips between the anvil bars and the draw bolts. The rack 12 may be removed from the housing 60 to facilitate this operation. The moisture equilibrium bridges or wicks 44 are positioned on their supporting rods 42 underneath the respective strips 11.

The paper strips 11 are then wetted by allowing about two milliliters of the buffer solution to trickle onto each strip, care being taken to distribute the buffer solution as evenly as possible over the entire length of the strip. Each of the strips is pulled taut so that the strip is held between the paper clamps 14 under sufficient tension to prevent sagging. The moisture equilibrium bridges or wicks 34 are wetted and the moisture equilibrium troughs 41 are filled with sufficient quantities of the buffer solution to immerse the ends of the bridges.

The buffer solution vessels 30 and 31 are filled with buffer solution to the same level, large quantities of the solution being provided in order to minimize changes in the pH thereof during the operation of the ionograph. In the case of aqueous buffer solutions, the tank 55 is filled with distilled water to a level near the upper edges of the buffer vessels 30 and 31. If a nonaqueous conductive liquid is employed to wet the strips 11 and to fill the vessels 30 and 31, the tank 55 is filled with the nonaqueous solvent employed in the conductive liquid. The electrode beakers 92 are filled with buffer solution to the same level as in the buffer vessels 30 and 31.

Placing the paper rack 12 on top of the vessels 30 and 31 and immersing the ends of the strips in the buffer solution are the next steps. The paper strips may be leveled accurately by manipulating the level screws 70, while observing the level bubbles 50.

The electrodes 90 are inserted into the buffer solution in the electrode beakers 92 and the salt bridges 94 are put in place with their opposite ends immersed in the buffer solutions in the electrode beakers and the buffer vessels. Then the cover 73 of the housing is closed.

It is highly desirable to replace the air atmosphere in the housing with an atmosphere of a highly heat-conductive gas such as helium or hydrogen, preferably helium because of the combustible nature of hydrogen. The helium or hydrogen should previously be saturated with water vapor at a temperature slightly higher than that of the buffer solution. One way of introducing the helium or hydrogen into the housing is to insert a rubber hose through one of the holes 80 in the cover 73.

To control the temperature in the housing 60, water at the desired temperature is circulated through the upper compartment 61 of the housing and the transparent panel 76 in the cover. The hydrogen or helium atmosphere in the housing 60 aids in maintaining the paper strips at substantially the same temperature as the buffer solutions and the circulating water in the water jacket of the housing.

A time interval of 15 to 30 minutes is allowed to elapse before placing the ionographic apparatus 10 into operation, in order to insure the establishment of equilibrium conditions of temperature and moisture in the housing 60. After this lapse of time, the stoppers 84 are removed singly from the holes 80 in the cover and test samples containing the migrant are added to the paper strips at previously marked points. The migrants are usually added in the form of solutions, but it is possible to add them in the solid state provided they are soluble or colloidally dispersible in the buffer solution.

A potential is applied between the electrodes 90 by energizing the electronic power supply 100. The magnitude of the potential is adjusted to the desired value by manipulating the control knob 101. Voltage and current readings may be made on the meters 102 and 103. The heat generated in the strips by the electrical current is rapidly dissipated by the helium or hydrogen atmosphere in the housing, since these gases are excellent conductors of heat. The hydrogen or helium atmosphere thus minimizes evaporation from the paper strips due to the electrically generated heat. In this way, chromatographic interference is largely eliminated.

Accurate and reproducible quantitative results are obtainable when ionography is practiced by means of a method and apparatus in accordance with this invention. The samples under test migrate along the paper strips at constant velocities, and, in consequence, the migratory movement is a linear function of the time during which the current is flowing in the strip. This result indicates that uniform conditions are maintained in the paper strip, with regard to moistness, ionic composition, potential gradient and temperature. The linearity of movement with respect to time is illustrated by the following example. In a series of runs for different time intervals, leucine was the migrant and acetic acid in a 0.1 molar solution was the buffer, with a pH of 2.8 The ionic strength of the migrant was held constant, the potential gradient was maintained at 22.5 volts per centimeter, and the temperature was confined to the range of 23 to 25 degrees centigrade. In Fig. 10, the results of the runs are plotted graphically, with movement in millimeters per volt per centimeter as ordinates and time in hours as abscissas. It will be evident that the data exhibit a linear relationship between the movement and the time.

Fig. 11 illustrates the results of another series of runs, in which the isoelectric pH of glutamic acid was determined by varying the pH of the buffer while maintaining its ionic strength constant at 0.013 and holding the voltage gradient at 15.7 volts per centimeter. Each run was for three hours at a temperature of 23 to 25 degrees centigrade. The pH range was covered by the use of various buffers, as follows: pH range of 2.2 to 3.8, potassium hydrogen phthalate and hydrochloric acid; pH 4.0 to 6.2, potassium hydrogen phthalate and sodium hydroxide; pH 5.8 to 8.0, potassium dihydrogen phosphate and sodium hydroxide; pH 7.8 to 10.0, potassium chloride and sodium hydroxide. The mobilities, in microns per second per volt per centimeter, are plotted against pH in Fig. 11, and the resulting curve indicates that the isoelectric pH is about 3.1, glutamic acid being positively charged below and negatively charged above this pH. Accurate data of the same sort may be obtained for other amino acids, and also proteins.

By means of this invention, the various constituents of a complex mixture, such as blood serum, can ordinarily be separated and identified, since they generally have different mobilities. Thus, in the course of a run, the constituents are translated to different points along the strip.

It is especially noteworthy that ionography may be employed for analyzing extremely small quantities of a substance, while in contrast, the older electrophoretic techniques generally require comparatively large samples.

We claim as our invention:

1. In an ionograph for carrying on electrophoresis and inophoresis on a paper strip moistened with an electrically conductive liquid, the combination comprising horizontally-spaced supports disposed in a common horizontal plane and adapted to support thereon and therebetween a strip of paper applied over said supports with opposite end portions of said applied strip depending from said supports, means adapted to positively engage said applied strip for suspending the medial portion thereof between said supports and for holding said medial portion under tension in substantially flat condition within said horizontal plane, a container for a conductive liquid positioned adjacent each support and adapted to receive the depending opposite end portions of said applied strip for immersing said end portions in respective quantities of the conductive liquid, an auxiliary container positioned between said first mentioned containers for holding a quantity of the conductive liquid, a wick having a portion disposed within the conductive liquid in said auxiliary container and a portion adapted to contact the applied strip for conveying liquid from the auxiliary container to said applied strip at a point between the ends thereof, and means for applying an electrical potential between the containers to produce a current in said applied strip.

2. In an ionograph for carrying on electrophoresis and ionophoresis on a paper strip moistened with an electrically conductive liquid, the combination comprising horizontally-spaced supports disposed in a common horizontal plane and adapted to support thereon and therebetween a strip of paper applied over said supports with opposite end portions of said applied strip depending from said supports, means adapted to positively engage said applied strip for suspending the medial portion thereof between said supports and for holding said medial portion under tension in substantially flat condition within said horizontal plane, a container for a conductive liquid positioned adjacent each support and adapted to receive the depending opposite end portions of said applied strip for immersing said end portions in respective quantities of the conductive liquid, an auxiliary container positioned between said containers below the normal horizontal position of the medial portion of said applied strip, a cross member above the auxiliary container and underlying said strip to support the medial portion thereof, a wick doubled over the cross member in contact with said strip and extending downwardly into the auxiliary container for maintaining the moistness of the applied strip, and means for applying an electrical potential between the containers to produce a current in the applied strip.

3. A method of carrying on electrophoresis and ionophoresis along a paper strip, comprising wetting the strip with a conductive liquid, leveling the strip, adding a test sample to the strip, producing a voltage gradient along the strip, surrounding the strip with an atmosphere of a gas having high heat conductivity substantially greater than that of air and saturated with vapor of the conductive liquid, and maintaining the atmosphere at a constant temperature.

4. An ionographic method involving the passage of an electrical current along a paper strip, comprising wetting the strip uniformly with a conductive liquid, surrounding the strip with an atmosphere of a gas having a heat conductivity substantially greater than that of air and saturated with vapor of the conductive liquid, adding a test sample to the strip, and passing an electrical current along the strip.

References Cited in the file of this patent

UNITED STATES PATENTS

| | | |
|---|---|---|
| 2,118,957 | Wagner | May 31, 1938 |
| 2,555,487 | Haugaard et al. | June 5, 1951 |

OTHER REFERENCES

"Transactions of The Faraday Society," vol. 33 (1937), pages 528 thru 530 of article by Tiselius.

"Chemical Abstracts," vol. 38 (1944), pages 526 thru 527, abstract of article by Berraz.

"Journal of the American Chemical Society," vol. 72 (1950), pages 2943 thru 2948, article by Durrum.

"Biochemische Zeitschrift," vol. 320 (1950), pages 273 thru 283, article by Cremer et al.

Wieland, "Angewandte Chemie," vol. 60 (1948), pages 313–316.